United States Patent [19]

Marcault

[11] 4,172,159

[45] Oct. 23, 1979

[54] PROCESS FOR COATING A GLASS SHEET WITH A SEMI-REFLECTIVE FILM OF TIN OXIDE

[75] Inventor: Jeannik Marcault, Colombes, France

[73] Assignee: Saint-Gobain Industries, Neuilly-sur-Seine, France

[21] Appl. No.: 878,465

[22] Filed: Feb. 16, 1978

[30] Foreign Application Priority Data

Feb. 16, 1977 [FR] France .................. 77 04357

[51] Int. Cl.² .................. B05D 1/12; B05D 5/06; C03C 17/22
[52] U.S. Cl. .................. 427/160; 427/164; 427/168
[58] Field of Search .................. 427/160, 164, 168

[56] References Cited

U.S. PATENT DOCUMENTS

| 2,566,346 | 9/1951 | Lytle et al. ................ 427/110 |
| 2,567,331 | 9/1951 | Gaiser et al. .............. 427/110 |
| 3,759,743 | 9/1973 | Menke ...................... 427/168 |
| 3,762,902 | 10/1973 | Wagner et al. ............ 65/60 |

FOREIGN PATENT DOCUMENTS

| 1217676 | 12/1959 | France ................ 427/110 |
| 1226725 | 7/1960 | France ................ 427/168 |
| 1293545 | 4/1962 | France ................ 427/168 |
| 2153044 | 4/1973 | France ................ 427/168 |

Primary Examiner—James R. Hoffman
Attorney, Agent, or Firm—Pennie & Edmonds

[57] ABSTRACT

The surface of a transparent refractory material such as glass or a vitreous ceramic is coated with a semi-reflective film of tin oxide by projecting finely divided particles of a pyrolytically decomposable organotin compound against the surface of the substrate material that has been heated to a temperature of between about 400° and 650° C. The finely divided organotin compound has a particle size of not greater than about 20 microns and is suspended in an anhydrous carrier gas to which carrier gas has been added a gaseous fluoride compound. In an advantageous embodiment of the process the pyrolytically decomposable organotin compound is dibutyl tin oxide, the carrier gas is dry air and the added fluoride compound is dry hydrogen fluoride.

7 Claims, 1 Drawing Figure

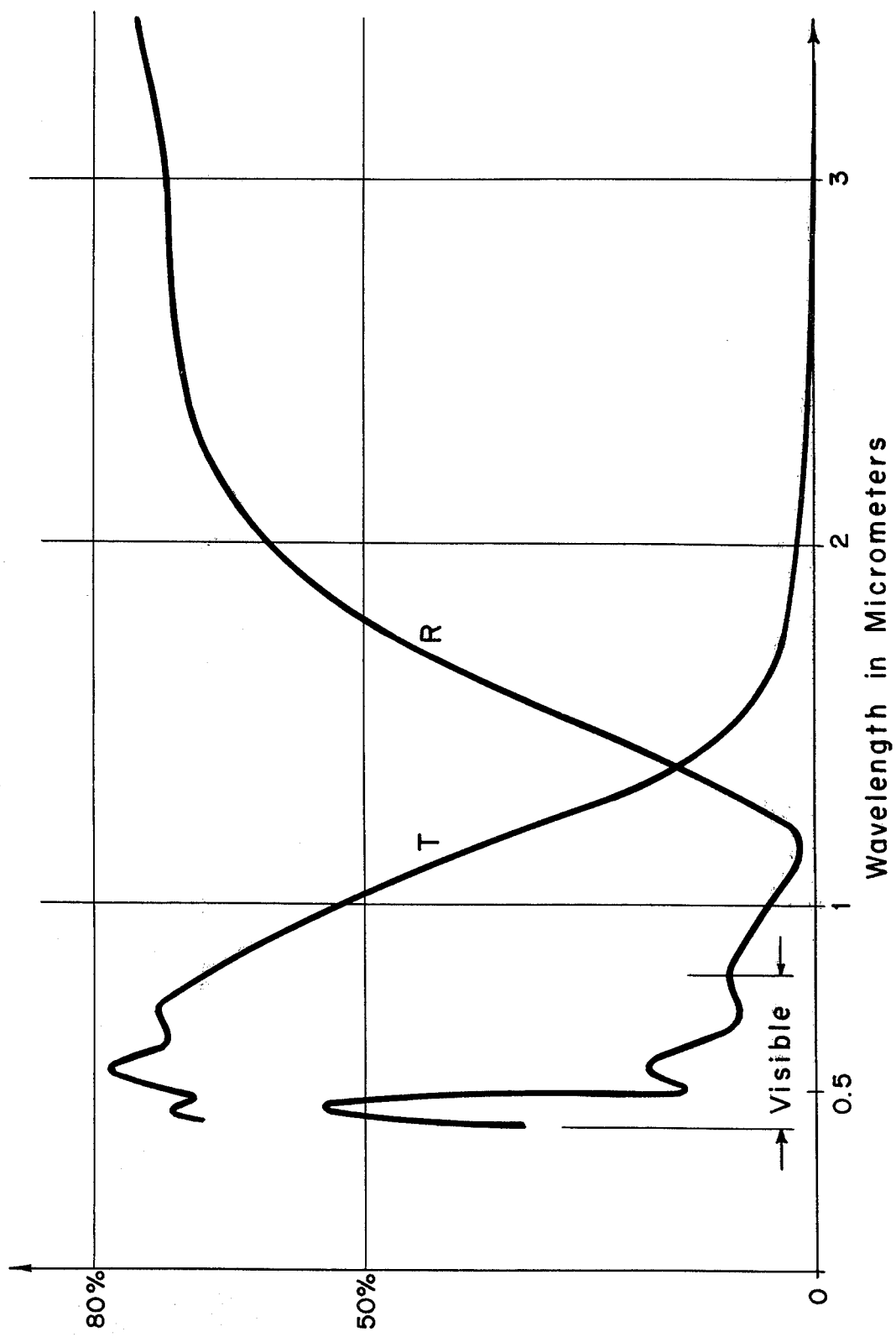

PROCESS FOR COATING A GLASS SHEET WITH A SEMI-REFLECTIVE FILM OF TIN OXIDE

BACKGROUND OF THE INVENTION

1. Field of the Invention

This invention relates to the coating of the surface of a refractory transparent substrate material, such as a glass sheet, with a semi-reflective adherent film of tin oxide by projecting a pyrolytically decomposable tin compound against substrate material.

2. Prior Art

It is well known that a thin adherent film of tin oxide disposed on the surface of a refractory transparent material such as a glass sheet or a vitreous ceramic material, will impart heat protective properties to the substrate material by substantially increasing the amount of infra-red radiation reflected from the coated surface while maintaining a satisfactory radiation transmission coefficient in the visible range of the solar spectrum.

It has heretofore been suggested that such infra-red reflective and visible spectrum transmissive films or coatings of tin oxide be formed in situ on the surface of the refractory substrate material by heating the substrate material to a high temperature but nonetheless below the softening point of said material and then projecting onto the surface of the hot substrate material an organic or inorganic tin compound that decomposes by pyrolysis upon contact with the surface of the hot substrate material, thereby leaving on said surface a heat-reflective transparent adherent film of tin oxide.

Up to now, this procedure has been carried out by various processes which, in general, involve the projection of a solution of a tin compound in an aqueous or organic solvent onto the surface of the refractory substrate material to be coated. However, these prior processes have not been entirely satisfactory because they all have drawbacks, either as far as the quality of the tin oxide film obtained is concerned (for example, unsatisfactory adherence, uniformity of thickness, transparency, optical or electrical conductivity properties, and the like), or as regards difficulties or complications involved in actual application (for example, preparation of the surface to be coated, auxiliary chemical reagents, preparation of solutions to be sprayed, removal of excess solution and solvent vapors or decomposition products, and the like).

SUMMARY OF THE INVENTION

I have now devised a new and improved process for coating a transparent refractory material with a semi-reflective transparent film of tin oxide that eliminates the aforementioned drawbacks of the known prior art processes. In my new process the refractory substrate material is heated to a temperature of from about 400° to 650° C., and then finely divided particles of a pyrolytically decomposable organotin compound suspended in an anhydrous carrier gas are projected against the surface of the hot substrate material, the organotin compound pyrolytically decomposing as it impinges against the hot substrate material to form the desired adherent coating of tin oxide thereon. The finely divided organotin compound has a particle size of not greater than about 20 microns, and it is a solid at room temperature and is pyrolytically decomposable at a temperature below that of the hot substrate material against the surface of which the organotin compound is projected. In addition, the anhydrous carrier gas contains, or has added thereto, an anhydrous gaseous fluoride compound without which the high quality tin oxide coating of the invention cannot be obtained. The gaseous fluoride compound advantageously is boron triflouride, bromine pentafluoride, chlorine trifluoride, silicon tetrafluoride, tungsten hexafluoride, molybdenum hexafluoride or hydrogen fluoride and is preferably introduced into the dry carrier gas at a point upstream from the nozzle that projects the gas stream onto the surface of the material being coated.

BRIEF DESCRIPTION OF THE DRAWING

The single FIGURE of the accompanying drawing shows the percent of incident solar radiation that is reflected and that is transmitted by a typical film of tin oxide formed on the surface of a glass sheet by the process of the invention.

DETAILED DESCRIPTION

In the process of the invention the transparent refractory material to be coated with the semi-reflective film of tin oxide is heated to a temperature above that at which the organotin compound employed in the process will pyrolytically decompose but below the softening temperature of the refractory substrate material, and more specifically to a temperature of from about 400° to about 650° C. A finely divided pyrolytically decomposable organotin compound suspended in an anhydrous carrier gas containing a gaseous fluoride compound is projected (for example, by a nozzle) against the surface of the hot substrate material where the organotin compound pyrolytically decomposes to form an adherent film of tin oxide on this surface. The tin oxide imparts desirable heat protective properties to the substrate material by substantially increasing the amount of infrared radiation that is reflected by the coated surface of the material without materially reducing the transmission therethrough of radiation in the visible range of the solar spectrum.

The substrate material to be coated may be any conventional transparent refractory material such as a glass sheet or a vitreous ceramic material, and advantageously is a sheet of "floated" glass.

The finely divided organotin compound should have a particle size of not more than about 20 microns, it should be a solid at ambient or room temperature, and it should be pyrolytically decomposable to form tin oxide at a temperature below that of the substrate material being coated. Organotin compounds useful in the practice of the process include but are not limited to: dibenzyltin acetate, dibutyltin oxide, diethyltin oxide, diisopropyltin oxide, dimethyltin oxide, and tribenzyltin hydroxide. Of these, I presently prefer to use dibutyltin oxide, for it is a particularly economic compound that can be carried by a dry air stream under pressure.

The anhydrous carrier gas is advantageously dry air or nitrogen to which an anhydrous gaseous fluoride has been added. Gaseous fluoride compounds useful in the practice of the process include but are not limited to boron trifluoride, bromine pentafluoride, chlorine trifluoride, silicon tetrafluoride, tungsten hexafluoride, molybdenum hexafluoride and hydrogen fluoride. Of these, I presently prefer to use hydrogen fluoride because of its availability and relative ease of handling.

The organotin compound is suspended in the anhydrous carrier gas by any known procedure, such as by injecting the finely divided organotin compound directly into a pressurized stream of the gas. The gaseous fluoride compound is then advantageously added to the carrier gas in which the particles of the organotin compound are suspended by introducing it into the moving gas stream at a point upstream from the point (that is, the nozzle) at which the organotin particles are projected onto the surface of the material being coated. Moreover, depending on the dimensions of the substrate material to be coated, one or more stationary or movable projection nozzles can be used, the substrate material being made to pass in front of the nozzle or nozzles.

The process according to the invention is an improvement over previous processes because of its simplicity of application and moderate cost. Specifically, there is no spray solution to be prepared; the use of a solvent is eliminated; and no auxiliary chemical reagent is required except for the gaseous fluorine compound, preferably hydrofluoric acid which is economical and very easy to produce by evaporation of liquid anhydrous hydrofluoric acid the boiling point of which does not exceed 20° C. at atmospheric pressure.

Experience has shown, furthermore, that the tin oxide film obtained by use of the process exhibits good adherence and satisfactory corrosion resistance. In addition, the film has the desired optical qualities of transparence in the visible range of the spectrum and reflection in the infra-red range, especially for wave lengths greater than 2 microns. Moreover, I have noted that the tin oxide films thus obtained have good electrical conductivity, which makes it possible to use the coated glass sheets as heating windows. Still another advantage of my new process is the fact that the process can be used on glass at a temperature of the order of 500° C., which makes it possible to apply the process to glass sheets leaving a thermal tempering station or even to sheets subjected to a chemical strengthening process.

The following example is illustrative but not limitative of the practice of the invention:

Powered dibutyltin oxide having a particle size of not greater than about 20 microns is introduced into a reservoir having a porous bottom. Compressed air used as a carrier gas is introduced into the reservoir beneath the porous bottom and after having gone through the latter and having picked up a quantity of tin compound particles, the carrier gas is introduced into a tube leading to two projection nozzles. The carrier air is at room temperature and its pressure is about 7 psi guage.

Upstream of each nozzle, the tube leading thereto is provided with an inlet for gaseous anhydrous hydrofluoric acid originating from liquid hydrofluric acid bottles maintained at a temperature of the order of 40° C. The projection nozzles are 25 cm apart and are directed horizontally. Floated glass sheets with dimensions of 500×500 mm and 6 mm thick are suspended vertically and then are heated by passing them while thus suspended through an oven maintained at 650° C. The heated glass sheets are then made to pass in front of the two projection nozzles.

The temperature of the glass sheets as they pass in front of the projection nozzles is of the order of 610° to 620° C. The rate of passage of the glass is set as a function of feed of the carrier gas containing the organotin compound so that 50 g of dibutyltin oxide is consumed per m² of glass processed (only part of this quantity being fixed onto the glass as tin oxide). The consumption of hydrofluoric acid is 35 g per m² of glass processed.

The samples of glass coated with tin oxide thus obtained were examined with respect to reflective power and the transmission coefficient as a function of wave length. The results obtained are expressed by the curves in the accompanying drawing.

In the drawing, curve T is the transmission curve for a typical sample expressed as percentage of light transmitted for each wave length. Curve R is the reflection curve for the sample. As can be seen, because of the strong reflection, the transmission of the glass becomes very low in the infra-red region for wave lengths greater than approximately 1.5 um.

In addition, measurements were made of the electrical resistance of the tin oxide film at various points on the surface of the samples (points 10 cm apart in both directions). The values obtained expressed in ohms/10 cm. are given in the table below:

| Electrical resistance in ohms/10 cm | | | | |
|---|---|---|---|---|
| 16 | 12 | 12 | 13 | 15 |
| 13 | 11 | 11 | 11 | 14 |
| 14 | 11 | 10 | 12 | 15 |
| 12 | 9 | 9 | 10 | 13 |
| 15 | 11 | 11 | 11 | 13 |

It can be seen that these values correspond to a highly satisfactory electrical conductivity which makes it possible to use these glass sheets as heating windows.

I claim:

1. A process for forming a semi-reflective coating of tin oxide on the surface of a transparent refractory substrate material which comprises:
    heating the substrate material to a temperature of from about 400° to 650° C.;
    projecting onto the surface of the hot substrate material finely divided particles of a pyrolytically decomposable organotin compound suspended in an anhydrous carrier gas;
    said finely divided organotin compound having a particle size of not greater than about 20 microns, and said compound being a solid at ambient temperature and being pyrolytically decomposable at a temperature below that of the hot substrate material against the surface of which the organotin compound is projected; and said anhydrous carrier gas containing a gaseous inorganic fluoride compound;
    whereby said organotin compound pyrolytically decomposes as it impinges against the surface of the hot substrate material to form the aforesaid adherent coating of tin oxide on said surface.

2. The process according to claim 1 in which the organotin compound is dibutyltin oxide.

3. The process according to claim 1 in which the gaseous fluoride compound is selected from the group consisting of boron trifluoride, bromine pentafluoride, chlorine trifluoride, silicon tetrafluoride, tungsten hexafluoride, molybdenum hexafluoride and hydrogen fluoride.

4. The process according to claim 1 in which the gaseous fluoride compound is anhydrous hydrofluoric acid.

5. The process according to claim 4 in which the organotin compound is dibutyltin oxide and the carrier gas is dry air.

6. The process according to claim 1 in which the gaseous fluoride compound is introduced into the anhydrous carrier gas at a point upstream from the point at which the particles of the organotin compound suspended in said carrier gas are projected against the surface of the hot substrate material.

7. The process according to claim 1 in which the substrate material is a thermally tempered or chemically reinforced glass sheet and in which the temperature of the substrate material does not exceed about 520° C.

* * * * *